United States Patent
Heckler et al.

(10) Patent No.: US 9,087,396 B2
(45) Date of Patent: Jul. 21, 2015

(54) DIGITAL IMAGE TEXT ADDITION

(75) Inventors: Claudio A. Heckler, Novo Hamburgo (BR); Adriane Q. Cardozo, Porto Alegre (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

(21) Appl. No.: 13/273,204

(22) Filed: Oct. 13, 2011

(65) Prior Publication Data

US 2013/0094034 A1  Apr. 18, 2013

(51) Int. Cl.
| | |
|---|---|
| *H04N 15/00* | (2006.01) |
| *G06T 11/00* | (2006.01) |
| *H04N 1/387* | (2006.01) |
| *H04N 1/60* | (2006.01) |

(52) U.S. Cl.
CPC ............. *G06T 11/00* (2013.01); *H04N 1/3871* (2013.01); *H04N 1/6005* (2013.01)

(58) Field of Classification Search
CPC .................................. G06K 9/00; G06K 9/34
USPC ..................... 358/1.9, 119, 2.1, 516; 345/629
See application file for complete search history.

(56) References Cited

U.S. PATENT DOCUMENTS

| | | | |
|---|---|---|---|
| 5,375,197 A | 12/1994 | Kanga | |
| 6,266,439 B1 | 7/2001 | Pollard et al. | |
| 7,536,048 B2 | 5/2009 | Moravec et al. | |
| 2003/0169248 A1* | 9/2003 | Kim et al. | 345/204 |
| 2004/0001229 A1* | 1/2004 | Hanyu | 358/2.1 |
| 2007/0047805 A1 | 3/2007 | Ohtsu | |
| 2007/0146389 A1* | 6/2007 | Distler | 345/629 |
| 2010/0074546 A1* | 3/2010 | Ishigami et al. | 382/251 |
| 2010/0165378 A1 | 7/2010 | Fujimori | |
| 2010/0195172 A1* | 8/2010 | Sawada | 358/516 |
| 2011/0115807 A1* | 5/2011 | Kim | 345/589 |

OTHER PUBLICATIONS

Mohsen Davoudi, Mehdi Davoudi, Nima SeifNaraghi, "Adaptive Subtitle and Caption Coloring Using Fuzzy Analysis," csie, vol. 4, pp. 764-768, 2009 WRI World Congress on Computer Science and Information Engineering, 2009.

* cited by examiner

*Primary Examiner* — Ashish K Thomas
*Assistant Examiner* — Bharatkumar Shah

(57) ABSTRACT

A method and apparatus to determine a brightness of an area of a digital image upon which text is to be added, select a color of the text based upon the determined brightness, and add a semi-transparent mask layer about the text to be added.

18 Claims, 2 Drawing Sheets

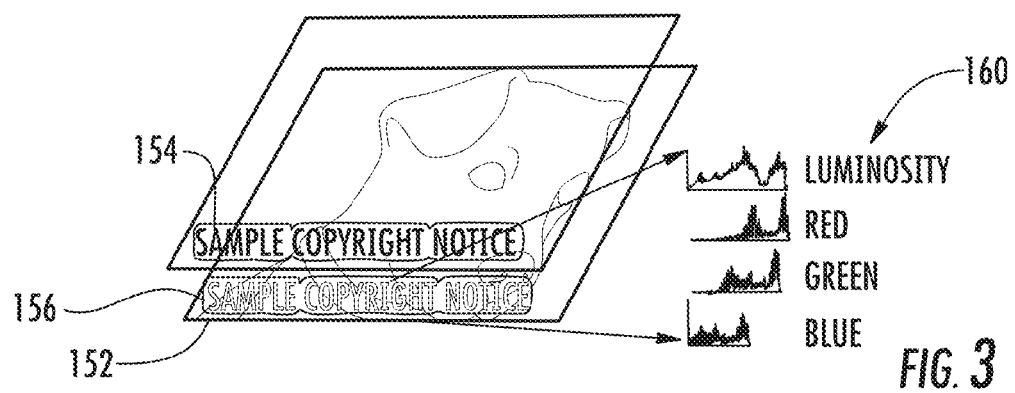
FIG. 3
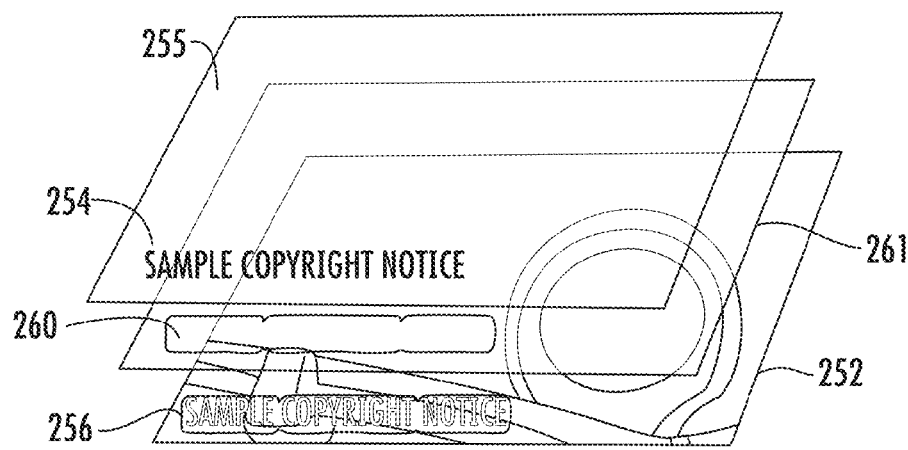
FIG. 4
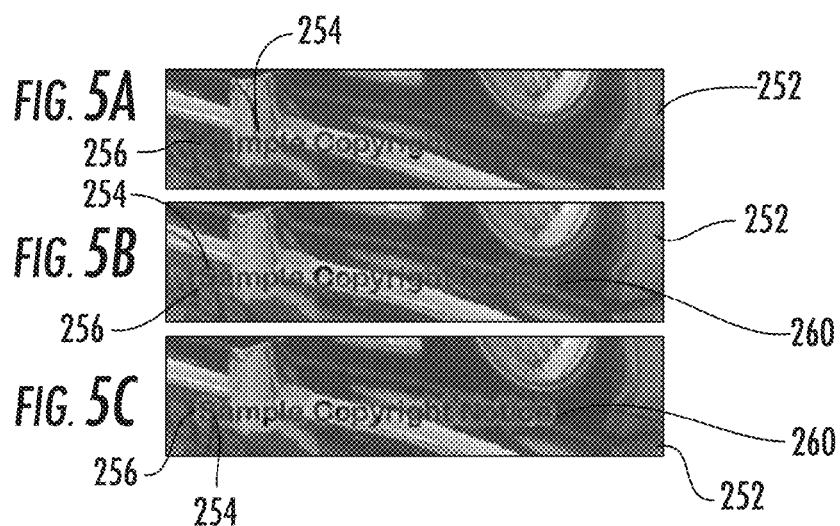
FIG. 5A
FIG. 5B
FIG. 5C

DIGITAL IMAGE TEXT ADDITION

BACKGROUND

In some circumstances, text may be added to a graphic image. The added text is frequently difficult to discern. In other circumstances, the added text may be so conspicuous that it detracts from the graphic image.

BRIEF DESCRIPTION OF THE DRAWINGS

FIG. 3 is a diagram illustrating an example of selection of a color for text being added to a region of a graphic image.

FIG. 4 is a diagram illustrating an example of layering of a semi transparent mask layer and stroke between text and a graphic image.

FIG. 5A is a diagram illustrating an example addition of text to an underlying graphic image without a stroke.

FIG. 5B is a diagram illustrating an example addition of the text to the underlying graphic image with a stroke having an opacity of 20%.

FIG. 5C is a diagram illustrating an example addition of the text to the underlying graphic image with the stroke having an opacity of 40%.

DETAILED DESCRIPTION OF THE EXAMPLE EMBODIMENTS

Figure 1:
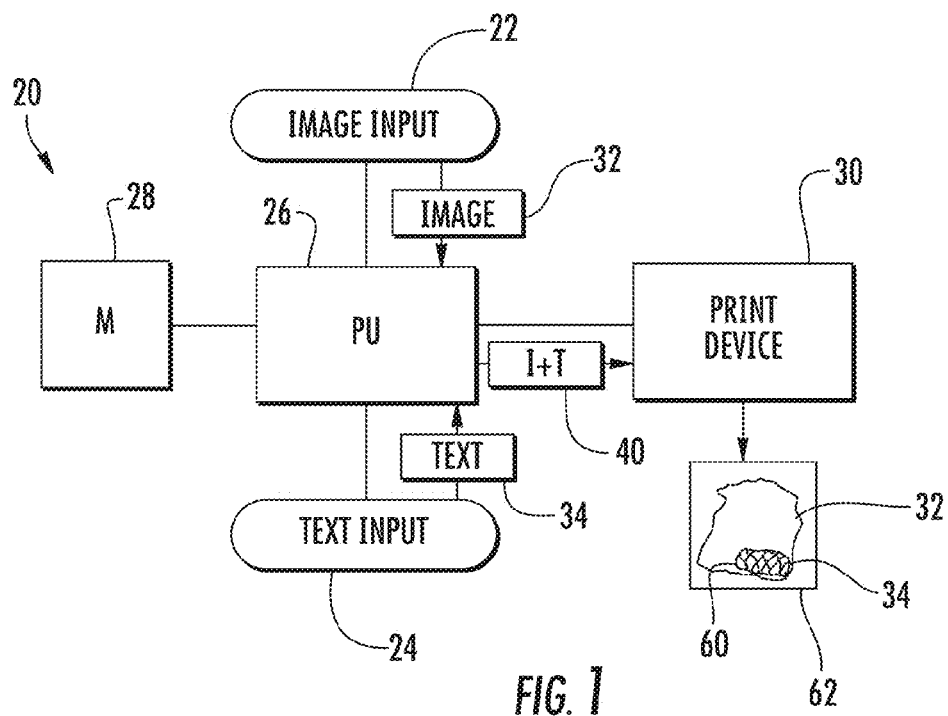
FIG. 1 is a schematic illustration of an example image text addition system.

FIG. 1 schematically illustrates an example image text addition system 20. As will be described hereafter, image text addition system 20 adds text to digital image in a manner such that the added text is discernible, yet not overly conspicuous so as to detract from the graphic image. System 20 comprises image input 22, text input 24, processing unit 26, memory 28 and print device 30.

Image input 22 comprises a device configured to input a graphic image to processing unit 26. Image input 22 may comprise a data receiving port for receiving a digital file of an image 32 or for being connected to a digital image capturing device such as a camera or scanner.

Text input 24 comprises a device to input text 34 that is to be added to image 32 to processing unit 26. Text input 24 may comprise the data receiving port for receiving such text. Text input 24 may comprise a keyboard, a touchpad, a touch screen and the like. For purposes of this disclosure, the term "text" refers to alpha-numeric symbols such as letters, numbers and symbols.

Processing unit 26 comprises one or more processing units configured to follow instructions provided in memory 28 for adding text 34 to image 32. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage serving as a non-transient computer-readable medium or memory 28. In other embodiments, hard wired circuitry may be used in place of or in combination with software instructions to implement the functions described. For example, processing unit 26 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 2:
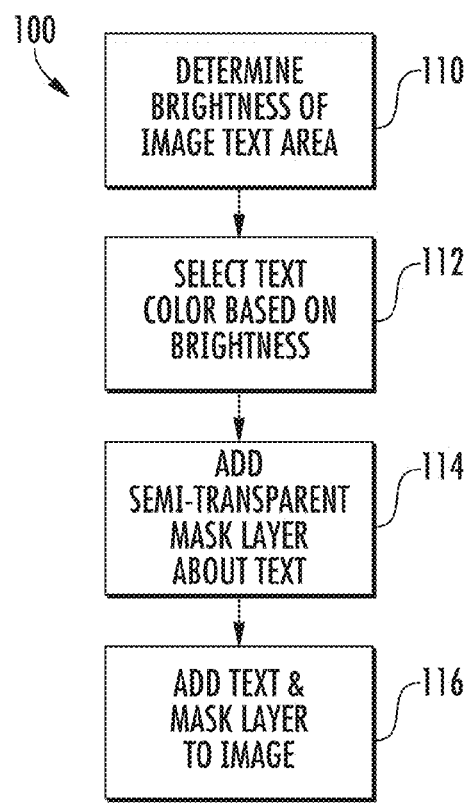
FIG. 2 is a flow diagram of an example method being carried out by the system of FIG. 1.

As noted above, processing unit 26 ads text 34 to digital image 32 in a manner such that the added text 34 is discernible, yet not overly conspicuous so as to detract from the graphic image 32. FIG. 2 is a flow diagram illustrating an example of a method 100 which may be carried out by processing unit 26 to add text 34 to digital image 32. In one embodiment, the method 100 illustrating FIG. 2 is embodied as code stored on a non-transient computer-readable medium in memory 28.

As indicated by step 110, upon receiving image 32 and receiving or otherwise determining a location for text 34 upon image 32, processing unit 26 determines a brightness or perceived brightness of an image text area of image 32 upon which the text 34 is to be added. As indicated by step 112, based upon the determined brightness, processing unit 26 selects a color for text 34 so as to provide text 34 with enhanced visibility. According to one example, processing unit 26 determines an average luminosity across all pixels of the area of image 32 that is to receive text 34. If on average, the area under the text is light, a dark color for text 34 is selected. Alternatively, if, on average, the area under the text is dark, a light color is selected. In one example, the text is black when the image text area is light or is white when the image text area is dark. In other examples, each color channel may be treated independently, wherein the color opposite to the color of the underlying image that is chosen for text 34 may be selected from the entire color or RGB (red green blue) spectrum.

FIG. 3 illustrates one example application of steps 110 and 112 by processing unit 26 to determine or select a color for text 154 to be added to a region 156 of an image 152. In the example illustrated, processing unit 26 generates a luminosity histogram 160 of region 156 and determines a mean luminosity across all pixels in region 156. In the example illustrated, processing unit 26 selects between black and white for the color of text 154. In the example illustrated, since luminosity histogram 160 for region 156 is biased towards lighter colors (red and green), processing unit 26 selects black for the color of text 154.

As described above with respect to FIG. 3, processing unit 26 determines a brightness or luminosity of region 156 which is to receive text 154. The perceived brightness of each pixel of region 156, which is used to determine the average luminosity or average brightness, may be determined by one of several methods. In one example, each individual pixel in region 156 may be expressed in the RGB system as a set of three components, red, green and blue. From these three component values, a single brightness may be determined as an average of the three components $((R+G+B)/3)$. Such an approach does not take into account the differences in the way each color is perceived.

Alternatively, the perceived brightness of each pixel in region 156 may be determined by applying different weights to each of the three color components of each pixel. For example, perceived brightness of the pixel, using its red, green and blue component values, may be determined according to the following expression $((R*299)+(G*587)+(B*114))/1000$, wherein the values 299, 587 and 114 are example weights applied to the different color components.

Still yet another alternative for determining the perceived brightness of each pixel in region 156 is to treat the RGB components of each pixel as being in a three-dimensional space, wherein brightness is a distance in space from the origin to the given color component. Accordingly the brightness of an individual pixel may be calculated by the expression: $(R^2+G^2+B^2)^{1/2}$. Using such a technique, weights may be applied to the different color components as well. For example, to account for differences in color perception, the perceived brightness may be determined using the following weighted distance calculation: $(0.241*R^2+0.691*G^2+0.068*B^2)^{1/2}$. Although any of the aforementioned methods or other methods may be used to determine brightness, weighted approaches may provide more accurate values for perceived brightness while unweighted calculations may be used for enhanced speed or performance.

Once the perceived brightness for each pixel in region 156 has been determined, processing unit 26 may utilize an average for the overall brightness of the targeted region 156. Assuming a range of brightness from 0 to 255, processing unit 26 utilizes a threshold value decide the color of text 154. In one example, if the mean brightness is above the threshold, a dark color, such as black, is selected. If the mean brightness is below the threshold, a light color, such as white or light yellow, is selected. In one example where brightness ranges from 0 to 255, the threshold value for selecting the color of text 154 is 128. In other examples, other ranges and other threshold values may be employed for selecting the color of text 154.

Referring back to FIG. 2, the next step carried out by processing unit 26 is to add a semi transparent mask layer about the text or about the text characters as indicated by step 114. The semi-transparent mask layer comprises a stroking effect which follows the outline of each individual character (alphanumeric symbol) of text 34. The stroking is drawn in a color opposite to that of the selected color for text and is wider or thicker than the corresponding text character.

FIG. 4 illustrates an example application of step 114 by processing unit 26 when adding text 254 (illustrated as part of a text layer 255) to an underlying region 256 of an underlying image layer or image 252. FIG. 4 depicts a layering scheme that can be used in composing the final image with text 254. FIG. 4 illustrates the semi-transparent stroke 260 (illustrated as part of a mask or stroke layer 261). In the example illustrated, processing unit 26 has selected a dark color, black, for text 254. As a result, processing unit 26 selects an opposite color or a lighter color, white or light gray, for the stroke 260. According one example, stroke 260 has an opacity of less than 50% and nominally between 10 and 20%.

FIGS. 5A-5C provide a comparison of the final image without stroke 260 and with different strokes 260 having different degrees or levels of opacity. As shown by FIG. 5A, the example image 252 is relatively "busy" in area or region 256 which is to underlie text 254. In other words, region 256 has a relatively non-uniform luminosity with high contrast edges such that a single color for text 254 may be difficult to discern. As shown by FIG. 5B, the layering of stroke 260 between image 252 and text 254 in an opposite color as that of text 254 (black for white text and white or gray for black text) and with a low opacity setting enhances the visibility or discernability of text 254. As shown by FIG. 5C, increasing the opacity of stroke 260 further increases the notice ability or discern ability of text 254. By selecting an appropriate level of opacity and an appropriate color for stroke 260, processing unit 26 may add a discernible, yet not overly conspicuous, text 254 to image 252. In circumstances where region 256 has a relatively uniform luminosity, stroke 260 is very subtle if not invisible. At the same time, in circumstances where region 256 has high contrast edges and varying luminosity, increasing the tendency for text to blend into the image, stroke 260 enhances text noticeability and readability.

In the above example, stroke 260 is illustrated and described as having a single color and extending about all of the individual characters of text 254. In other examples, different strokes and different semi-transparent mask layers having different strokes with different colors or different opacity levels may be provided for each individual characters or less than complete portions of text 254. For example, in the example shown in FIG. 5C, the letter N in the text 254 may be surrounded by a first stroke having a first color and/or a first opacity level while the letter p in the word "copyright" may have a second color different than the first color and/or a second opacity level different than the first opacity level. For purposes of this disclosure, the term "color" includes black, white and all combinations of red, green and blue color components there between. The term "color" also includes different shades.

Referring once again to FIG. 2, processing unit 26 completes the operation by adding text 34 and the added mask layer with the semi transparent stroke 60 to image 32 as indicated by step 116 to form the final or completed text added image 40 shown in FIG. 1. In some embodiments, the text added image 40 is then transmitted to print device 30. Print device 30 comprises a device configured to print the digital image 32 with the associated text 34 and stroke 60 surrounding text 34 on a print medium 62. Examples of print device 30 include, but are not limited to, an electrophotographic printer, an inkjet printer or other printing device. In other examples, the text added image 40 may be electronically displayed on a screen or monitor.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
    determining, with a processing unit that has received a digital image, a brightness of an area of the digital image, the area being designated as an area upon which text is to be added to the digital image;
    selecting, with the processing unit, a color of the text based upon the determined brightness;
    adding, with the processing unit, a semi-transparent mask layer to the digital image, wherein a colored portion of the semi-transparent mask layer follows an outline of individual characters of the text being added to the digital image; and
    adding the text, to be outlined by the coloration of the semi-transparent mask layer, to the digital image with the processing unit.

2. The method of claim 1 further comprising selecting, with the processing unit, a color of the colored portion of the mask layer based upon the selected color of the text and an underlying brightness of the digital image.

3. The method of claim 1, wherein determining the brightness of the area upon which text is to be added comprises generating a luminosity histogram for the area.

4. The method of claim 1, wherein the colored portion of the mask layer has a width greater than a width of the text.

5. The method of claim 1, wherein the colored portion of the mask layer comprises at least two differently colored areas corresponding to different portions of the text being added.

6. The method of claim 1, wherein the step of determining the brightness of the area of the digital image comprises determining a brightness of each of a number of individual pixels in the area by calculating a perceived brightness for the color of each individual pixel.

7. The method of claim 6, wherein components, red, green and blue, of a color of each individual pixel are assigned different weights, the weights accounting for differences in color perception.

8. The method of claim 7, wherein the components, red, green and blue, of the color of each individual pixel are defined in a three-dimensional space, wherein brightness is calculated as a distance in space from an origin to the component.

9. The method of claim 8, wherein the semi-transparent mask layer has an opacity of less than 50%.

10. The method of claim 1, wherein the semi-transparent mask layer has an opacity of between 10% and 20%.

11. The method of claim 1, wherein the color selected is chosen from black or white.

12. The method of claim 11, wherein the semi transparent mask layer has a color opposite to the color selected for the text.

13. An apparatus comprising:
a processing unit to:
determine a brightness of an area of a digital image, the area being designated as an area upon which text is to be added to the digital image;
select a color of the text based upon the determined brightness,
add the text to the digital image; and
add a semi-transparent mask layer to the digital image, wherein a colored portion of the semi-transparent mask layer follows an outline of individual characters of the text added to the digital image, the colored portion of the mask layer being selected based on the selected color of the text and an underlying brightness of the digital image,
in which the brightness is a perceived brightness, the perceived brightness being determined using the following expression:

$$((R*X)+(G*Y)+(B+*Z))/1000$$

in which R represents a red component value, G represents a green component value, and B represents a blue component value of an RGB spectrum, and X, Y, and Z represent weights applied to R, G, and B component values, respectively.

14. An apparatus comprising:
a non-transient computer-readable medium having instructions for directing a processing unit to:
determine a brightness of an area of a digital image, the area being designated as an area upon which text is to be added to the digital image;
select a color of the text based upon the determined brightness; and
add a semi-transparent mask layer comprising a colored portion about an outline of the text being added to the digital image,
wherein determining the brightness of the area of the digital image comprises determining a brightness of each of a number of individual pixels in the area by calculating a perceived brightness for a color of each individual pixel,
wherein components, red, green and blue, of the color of each individual pixel are assigned different weights, the weights accounting for differences in color perception.

15. The apparatus of claim 13, wherein the processing unit is configured to select the color of the mask layer that contrasts both the color of the text and the color of the digital image.

16. The apparatus of claim 14, wherein the colored portion of the mask layer outlines each individual character of the text, wherein the colored portion has a width greater than a width of the text.

17. The apparatus of claim 13, wherein the colored portion of the mask layer comprises at least two differently colored areas corresponding to different portions of the text being added.

18. The apparatus of claim 13, wherein an opacity of the colored portion of the mask layer is based on a uniformity of the brightness of the area designated to receive the text.

\* \* \* \* \*